US008922497B2

(12) United States Patent
Miyazawa et al.

(10) Patent No.: US 8,922,497 B2

(45) Date of Patent: Dec. 30, 2014

(54) DISPLAY APPARATUS, DISPLAY METHOD AND PROGRAM FOR DETECTING AN OPERATION PERFORMED ON A DISPLAY SCREEN

(75) Inventors: Yusuke Miyazawa, Tokyo (JP); Fuminori Homma, Tokyo (JP); Tatsushi Nashida, Kanagawa (JP)

(73) Assignee: Sony Corporation, Tokyo (JP)

(*) Notice: Subject to any disclaimer, the term of this patent is extended or adjusted under 35 U.S.C. 154(b) by 989 days.

(21) Appl. No.: 12/845,948

(22) Filed: Jul. 29, 2010

(65) Prior Publication Data

US 2011/0032198 A1 Feb. 10, 2011

(30) Foreign Application Priority Data

Aug. 5, 2009 (JP) ................................ P2009-182581

(51) Int. Cl.
*G06F 3/041* (2006.01)

(52) U.S. Cl.
CPC .... *G06F 3/0416* (2013.01); *G06F 2203/04101* (2013.01)
USPC ........................................ 345/173; 178/18.01

(58) Field of Classification Search
USPC ........................................ 345/173; 178/18.01
See application file for complete search history.

(56) References Cited

U.S. PATENT DOCUMENTS

2002/0196238 A1* 12/2002 Tsukada et al. ............... 345/173
2003/0006973 A1* 1/2003 Omura et al. ................ 345/175
2003/0206306 A1* 11/2003 Omura et al. ................ 356/620
2005/0110756 A1* 5/2005 Hall et al. ..................... 345/161
2006/0161870 A1* 7/2006 Hotelling et al. ............. 715/863
2006/0161871 A1* 7/2006 Hotelling et al. ............. 715/862
2006/0170658 A1* 8/2006 Nakamura et al. ............ 345/173
2008/0098331 A1* 4/2008 Novick et al. ................ 715/835
2009/0058829 A1* 3/2009 Kim et al. ..................... 345/173
2009/0122007 A1* 5/2009 Tsuzaki et al. ............... 345/156
2009/0237371 A1* 9/2009 Kim et al. ..................... 345/173
2009/0239588 A1* 9/2009 Nam ............................ 345/173
2009/0244023 A1* 10/2009 Kim et al. .................... 345/173
2009/0289914 A1* 11/2009 Cho ............................. 345/173
2009/0295715 A1* 12/2009 Seo et al. ..................... 345/156

FOREIGN PATENT DOCUMENTS

JP 2006-251927 9/2006
JP 2009-075656 4/2009

* cited by examiner

*Primary Examiner* — Adam J Snyder
(74) *Attorney, Agent, or Firm* — Sherr & Jiang, PLLC

(57) ABSTRACT

There is provided a mobile display apparatus applied to the display apparatus including a display screen; a touch panel that detects an operation performed by a user in the display screen; state decision unit that decides one of a contact state, a proximity state and a distant state with the display screen based on the user's operation detected by the touch panel; a state change identification unit that identifies a state change in the user's operation according to the state decided by the state decision unit; and an operation command setting unit that sets an operation command depending on the state change identified by the state change identification unit when setting the operation command for controlling display of the display screen in response to the user's operation.

15 Claims, 10 Drawing Sheets

P
Th
12
14
DISTANT
Th
P
12
14
PROXIMITY
Th
12
P
14
CONTACT

<DOUBLE TAP>
12
14
16
t[sec]
DISTANT
PROXIMITY
CONTACT
PROXIMITY
CONTACT
PROXIMITY
DISTANT
ONCE PRESSED, EXPRESSION OF BUTTON CHANGES UNTIL FINGER COMES OUT OF PROXIMITY REGION

DISPLAY APPARATUS, DISPLAY METHOD AND PROGRAM FOR DETECTING AN OPERATION PERFORMED ON A DISPLAY SCREEN

BACKGROUND OF THE INVENTION

1. Field of the Invention

The present invention relates to a display apparatus, a display method and a program. Particularly, the present invention relates to a display apparatus, a display method and a program that detect an operation performed by a user in a display screen by a device and control display of the display screen according thereto.

2. Description of the Related Art

Recently, mobile devices incorporating a transmission touch panel have been on the increase. Many of such devices incorporate the largest possible display, and great importance is placed on technology in a user interface so as to enable an intuitive operation by a touch panel mounted on the display. However, in the case of operating a button displayed on the display with a user's finger, it is necessary to display the button with a certain size or larger in order to reduce operating errors. It is thus difficult to display many graphical user interface (GUI) buttons in a mobile device whose display size is inevitably limited.

To address such concern, a technique that assigns a plurality of different commands depending on a press force when a user presses one button by using a device capable of detecting the finger touching position and pressure has been proposed (cf. e.g. Japanese Unexamined Patent Application Publication No. 2006-251927). This technique raises a possibility of offering wider variations in operation.

Further, a technique that highlights a button to be operated by a user upon detecting an approaching finger has been proposed (cf e.g. Japanese Unexamined Patent Application Publication No. 2009-75656). This technique allows a user to check which button is to be pressed, which raises a possibility of reducing operating errors.

SUMMARY OF THE INVENTION

However, in the technique of Japanese Unexamined Patent Application Publication No. 2006-251927, it is necessary for a user to adjust a pressure when pressing a button, which places a high operating load on the user. Further, because it is necessary to detect a press force, the device structure is complicated.

Further, in the technique of Japanese Unexamined Patent Application Publication No. 2009-75656, a different display control can be made by applying a different interaction between a proximity state and a contact state; however, it is difficult for a user to operate a screen by clearly distinguishing between the proximity state and the contact state, and operating errors are likely to increase. Further, in the application of this technique to a mobile device, because the display size of the mobile device is limited as described above, the size of GUI buttons or the like need to be small accordingly. In addition, due to large noise, it is difficult to use detection of the proximity state and detection of the contact state as a trigger of a different interaction for the same button.

In light of the foregoing, it is desirable to provide a novel and improved display apparatus, display method and program that change display of a display screen depending on a change in user's operation state in addition to discrimination between contact and non-contact with a screen in response to an operation performed by a user in the display screen.

According to an embodiment of the present invention, there is provided a display apparatus which includes a display screen; a device that detects an operation performed by a user in the display screen; state decision unit that decides one of a contact state, a proximity state and a distant state with the display screen based on the user's operation detected by the device; a state change identification unit that identifies a state change in the user's operation according to the state decided by the state decision unit; and an operation command setting unit that sets an operation command depending on the state change identified by the state change identification unit when setting the operation command for controlling display of the display screen in response to the user's operation.

In this embodiment, when setting an operation command for controlling display of the display screen in response to an operation performed by a user, the operation command is set depending on a state change identified by the state change identification unit. It is thereby possible to increase variations in screen operation and enhance usability.

The display apparatus further may include a screen control unit that changes display of the display screen according to the operation command set by the operation command setting unit.

The state change identification unit may identify from which to which of the contact state, the proximity state and the distant state the operation performed by a user in the display screen has changed based on a decision result by the state decision unit, and the operation command setting unit may set a different operation command depending on the state change identified by the state change identification unit.

A storage unit may store a previous decision result by the state decision unit, wherein the state change identification unit may identify a state change from the contact state to the distant state with the display screen or a state change from the contact state to the proximity state with the display screen based on the previous decision result stored in the storage unit and a current decision result by the state decision unit, and the operation command setting unit sets a different operation command depending on the state change identified by the state change identification unit.

When the state change identified by the state change identification unit is a state change from the contact state to the distant state, the operation command setting unit may direct the screen control unit to execute the set operation command.

When the state change identified by the state change identification unit is a state change from the contact state to the proximity state, the operation command setting unit may direct the screen control unit to refrain from executing the set operation command.

According to another embodiment of the present invention, there is provided a display method which includes the steps of: detecting an operation performed by a user in a display screen by a device; deciding one of a contact state, a proximity state and a distant state with the display screen based on the user's operation detected by the device; identifying a state change in the user's operation according to the decided state; and setting an operation command depending on the identified state change when setting the operation command for controlling display of the display screen in response to the user's operation.

According to another embodiment of the present invention, there is provided a program causing a computer to execute a process including processing of: detecting an operation performed by a user in a display screen by a device; deciding one of a contact state, a proximity state and a distant state with the display screen based on the user's operation detected by the device; identifying a state change in the user's operation according to the decided state; and setting an operation command depending on the identified state change when setting the operation command for controlling display of the display screen in response to the user's operation.

According to the embodiments of the present invention described above, it is possible to change display of a display screen depending on a change in user's operation state in addition to discrimination between contact and non-contact with a screen in response to an operation performed by a user in the display screen.

DETAILED DESCRIPTION OF THE EMBODIMENT(S)

Figure 1:
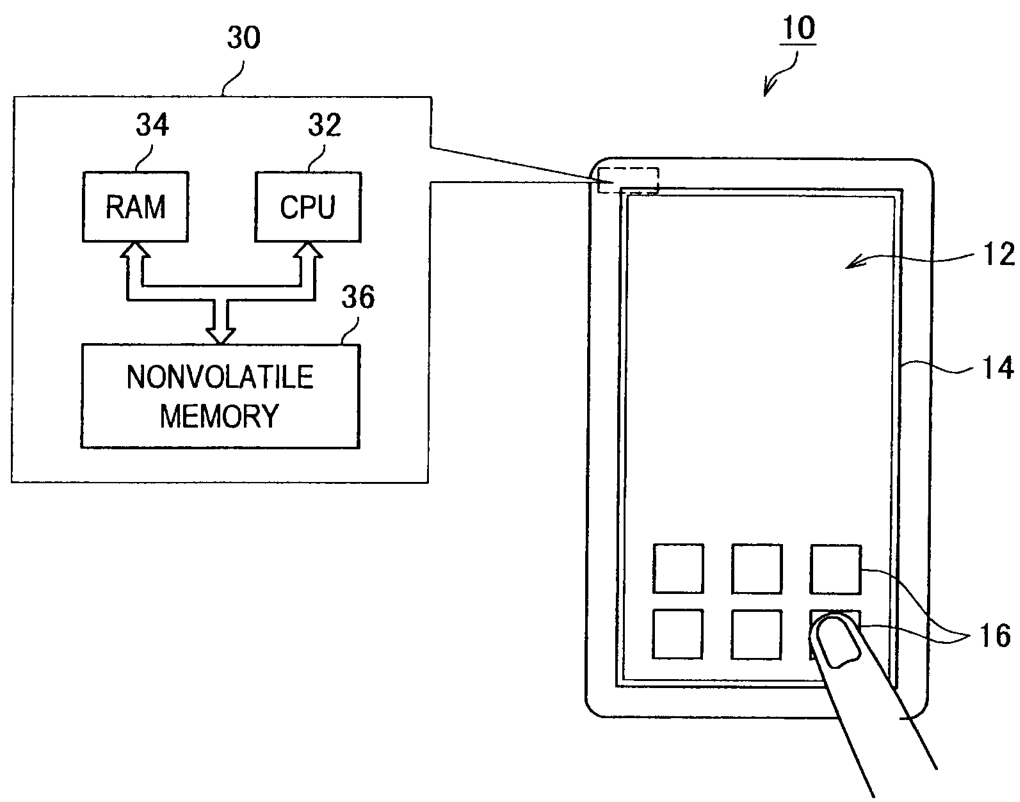
FIG. 1 is a view showing a mobile device according to first and second embodiments of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that a mobile device to which a display apparatus according to each embodiment of the present invention described hereinbelow is applied is preferably a portable electronic device such as a cellular phone, a portable music player or a mobile information terminal (personal digital assistant (PDA)). However, the display apparatus according to the present invention may be applied to an information processing device such as a notebook personal computer (PC) or a desktop PC.

The description will be given in the following order.

<First Embodiment>

[1-1. Hardware Configuration of Mobile Device]

[1-2. Functional Configuration of Mobile Device]

[1-3. Operation of Mobile Device: Operation Command Determination Process]

(Assignment of Single Tap or Double Tap)

(Assignment of Tap or Weak Tap)

<Second Embodiment>

[2-1. Functional Configuration of Mobile Device]

[2-2. Operation of Mobile Device: Operation Command Determination Process]

(Execution and Non-Execution of Drag-and-Drop)

<Alternative Example>

First Embodiment

1-1. Hardware Configuration of Mobile Device

A hardware configuration of a mobile device according to a first embodiment of the present invention is described hereinafter with reference to FIG. 1. A mobile device 10 according to the embodiment is a device that has a transmission touch panel incorporating a sensor capable of detecting a user's finger position on a display 12. The mobile device 10 can receive various contents via a network, not shown, and display them on the display 12.

As the display 12, a liquid crystal display (LCD), an organic electroluminescence display (OELD) or the like may be used, for example.

Figure 2:
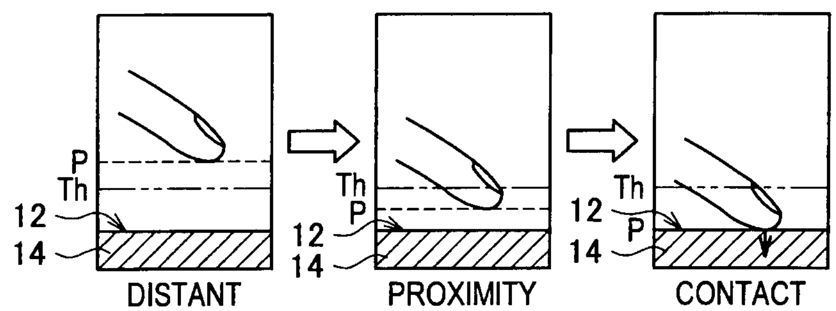
FIG. 2 is a view to describe detection of a finger state by the mobile device according to the first and second embodiments.

A touch panel 14 is mounted on the display 12. The touch panel 14 detects a screen operation performed by a user on various kinds of GUI buttons 16 displayed on the display 12. The touch panel 14 detects a finger position in the x-direction and the y-direction and also detects a finger state in the z-direction with respect to the display 12. The touch panel 14, which is a transmission type, can measure a contact state and a proximity state of a finger on the display 12 as shown in FIG. 2.

For example, when a distance P from a finger to the surface of the display 12 is larger than a predetermined threshold Th, the touch panel 14 detects nothing. In this case, it is determined that the finger is in a distant state from the display 12.

Further, when the distance P from a finger to the surface of the display 12 is smaller than the predetermined threshold Th and the distance P is not zero, the touch panel 14 detects that the finger exists in a proximity region. In this case, it is determined that the finger is in a proximity state to the display 12.

Further, when the distance P from a finger to the surface of the display 12 is zero, the touch panel 14 detects that the finger is in contact with the display 12. In this case, it is determined that the finger is in a contact state with the display 12.

Note that the touch panel 14 incorporated in this embodiment and a touch panel incorporated in a second embodiment or an alternative example described later may be an electrostatic or optical panel as long as it is a transmission type. Further, the touch panel 14 corresponds to a device that is mounted on the display 12 and detects a screen operation performed by a user in the display 12.

In the mobile device 10, a microprocessor 30 including a CPU 32, RAM 34 and nonvolatile memory 36 shown in FIG. 1 is embedded. Each memory temporarily stores information related to the screen operation detected by the touch panel 14. The CPU 32 controls an operation command determination process, which is described later. Note that the following hardware configuration can be also regarded as a hardware configuration of a display apparatus incorporated into a mobile device.

1-2. Functional Configuration of Mobile Device

Figure 3:
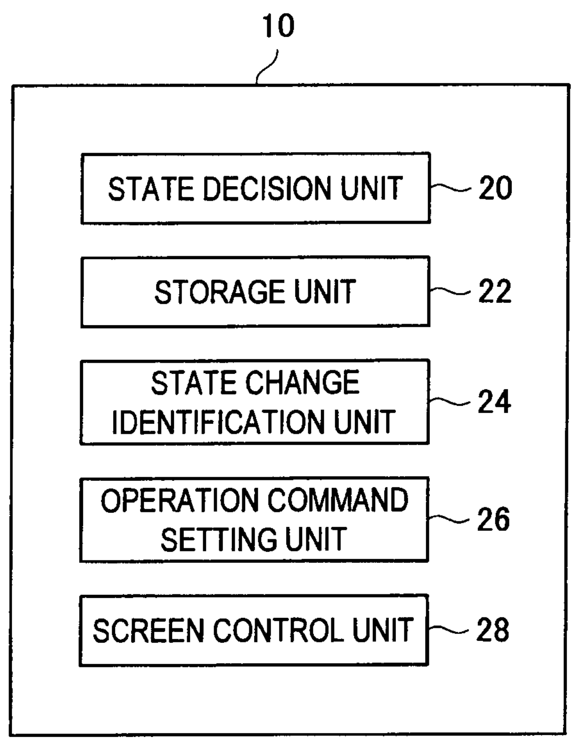
FIG. 3 is a functional block diagram of the mobile device according to the first and second embodiments.

The mobile device 10 according to the first embodiment has a functional configuration shown in the functional block of FIG. 3. Specifically, the mobile device 10 according to the embodiment includes a state decision unit 20, a storage unit 22, a state change identification unit 24, an operation command setting unit 26, and a screen control unit 28.

The state decision unit 20 decides which of the contact state, the proximity state and the distant state with the display 12 the finger operation state applies based on the user's operation detected by the touch panel 14.

The storage unit 22 stores a decision result by the state decision unit 20. Specifically, the storage unit 22 stores which of the contact state, the proximity state and the distant state each decision result is. In the following description, the previous user's operation state is indicated by P(t−1), and the current user's operation state is indicated by P(t).

The state change identification unit 24 identifies a change in user's operation state according to the state decided by the state decision unit 20. Specifically, the state change identification unit 24 identifies from which to which of the contact state, the proximity state and the distant state the operation performed by a user in the display 12 has changed based on the decision result of the state decision unit 20. The state change identification unit 24 identifies a state change from the contact state to the distant state with the display 12 or a state change from the contact state to the proximity state with the display 12 based on the previous decision result stored in the storage unit 22 and the current decision result by the state decision unit 20.

The operation command setting unit 26 sets an operation command for controlling display of the display 12 in response to an operation performed by a user. In this regard, the operation command setting unit 26 sets an operation command depending on the state change identified by the state change identification unit 24.

The screen control unit 28 changes display of the display 12 depending on the state change identified by the state change identification unit 24 according to the operation command set by the operation command setting unit 26.

Commands to the respective functional elements of the mobile device 10 described above are executed by a dedicated control device or the CPU 32 that executes a program. The program for executing the operation command determination process described hereinbelow is prestored in the RAM 34 or the nonvolatile memory 36. The CPU 32 reads and executes each program from such memory to thereby implement each function of the state decision unit 20, the storage unit 22, the state change identification unit 24, the operation command setting unit 26 and the screen control unit 28.

1-3. Operation of Mobile Device: Operation Command Determination Process

Figure 4:
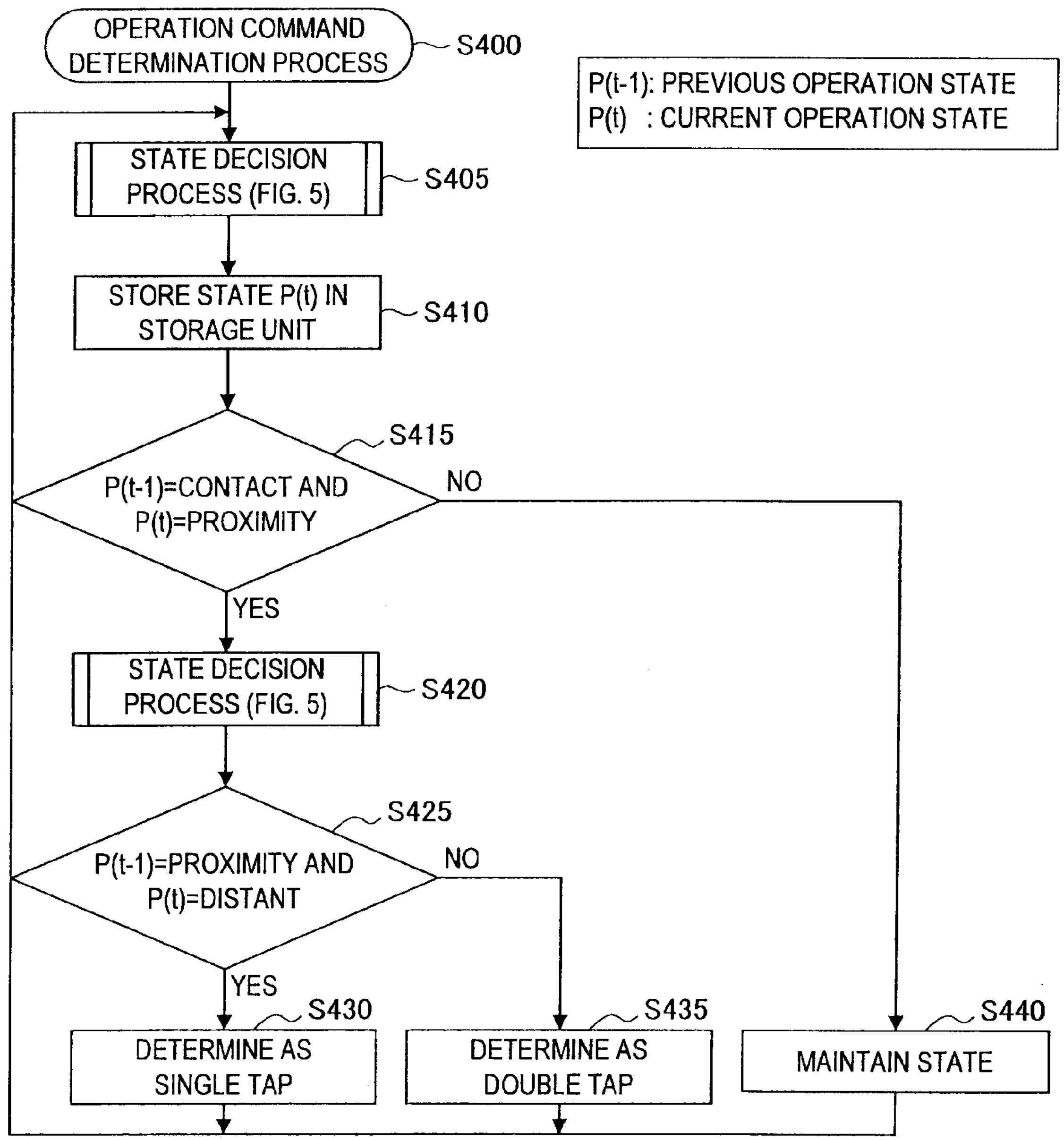
FIG. 4 is a flowchart showing an operation command determination process (main routine) executed in the mobile device according to the first embodiment.

The operation command determination process of the mobile device 10 according to the embodiment is described hereinafter with reference to FIG. 4. FIG. 4 is a flowchart showing the operation command determination process that is executed by the mobile device 10 according to the embodiment. Note that the following operation can be also regarded as the operation of a display apparatus incorporated into the mobile device 10 according to the embodiment.

Figure 5:
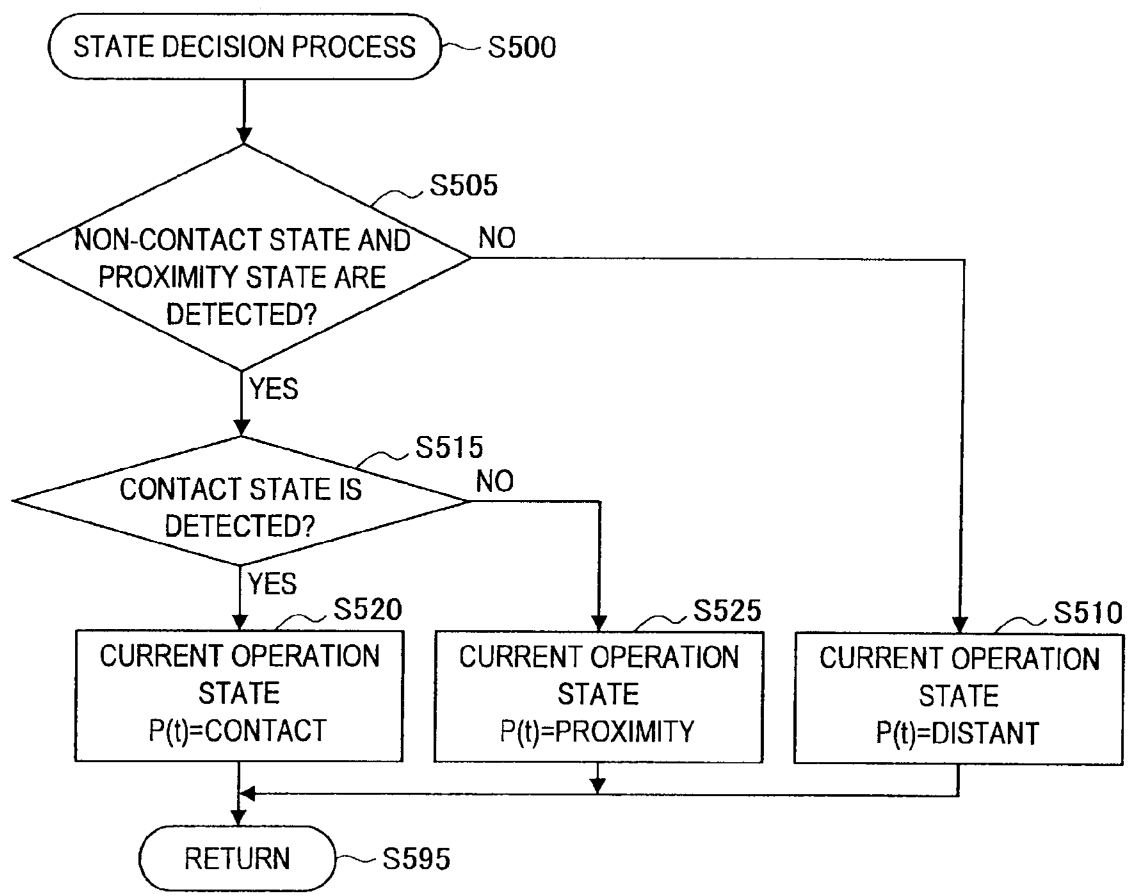
FIG. 5 is a flowchart showing a state decision process (subroutine) executed in the mobile device according to the first embodiment.

When the operation command determination process is started in the step S400, the state decision unit 20 executes a routine of a state decision process (FIG. 5) in the step S405. The state decision process starts from the step S500 in FIG. 5. The state decision unit 20 decides whether a user's finger is in a non-contact state and in the proximity state with the display 12 based on the user's operation detected by the touch panel 14 in the step S505. As described earlier, when the distance P from the display 12 to a finger is larger than the given threshold Th, it is determined that the finger is in the distant state shown in FIG. 2. In this case, the process proceeds to the step S510, and the state decision unit 20 decides that the current operation state P(t) is the distant state, and then the process returns from the step S595 to the step S410 in FIG. 4.

On the other hand, if the determination in the step S505 results in YES, the process proceeds to the step S515, and the state decision unit 20 decides whether a finger is in contact with the display 12. As described earlier, when the distance P from the display 12 to a finger is zero, it is determined that the finger position is in the contact state in FIG. 2. In this case, the process proceeds to the step S520, and the state decision unit 20 decides that the current operation state P(t) is the contact state, and the process returns from the step S595 to the step S410 in FIG. 4.

On the other hand, if the determination in the step S515 results in NO, the process proceeds to the step S525, and the state decision unit 20 decides that the current operation state P(t) is the proximity state, and the process returns from the step S595 to the step S410 in FIG. 4.

In the step S410, the storage unit 22 stores the operation state P(t) decided this time. Then, the process proceeds to the step S415, and the state change identification unit 24 identifies whether the finger state has changed from the contact state to the proximity state. Specifically, the state change identification unit 24 identifies whether the previously decided operation state P(t−1) stored in the storage unit 22 is the contact state and the currently decided operation state P(t) is the proximity state.

When the state change is from the contact state to the proximity state, the process proceeds to the step S420 to execute the state decision process in FIG. 5 again, and then proceeds to the step S425. In the step S425, the state change identification unit 24 identifies whether the finger state has changed from the proximity state to the distant state. Specifically, the state change identification unit 24 identifies whether the previously decided operation state P(t−1) stored in the storage unit 22 is the proximity state and the currently decided operation state P(t) is the distant state.

As a result of the identification, when the state changes from the contact state to the proximity state (S415) and further changes from the proximity state to the distant state (S425), the process proceeds to the step S430. In the step S430, the operation command setting unit 26 determines that it is a single tap and sets an operation command of a screen operation that is assigned in advance to the single tap.

On the other hand, as a result of the identification, when the state changes from the contact state to the proximity state (S415) and does not change from the proximity state to the distant state (S425), the process proceeds to the step S435. In the step S435, the operation command setting unit 26 determines that it is a double tap and sets an operation command of a screen operation that is assigned in advance to the double tap.

Note that, when the state change identification unit 24 identifies in the step S415 that the state does not change from the contact state to the proximity state, the process proceeds to the step S440, and the operation command setting unit 26 maintains the current state without setting an operation command for changing display of the display 12.

(Assignment of Single Tap or Double Tap)

As a specific example of the operation command determination process described above, an example of assigning a single tap or a double tap as an operation command depending on a difference in state change is described hereinafter with reference to FIGS. 6 and 7.

(Single Tap)

Figure 6:
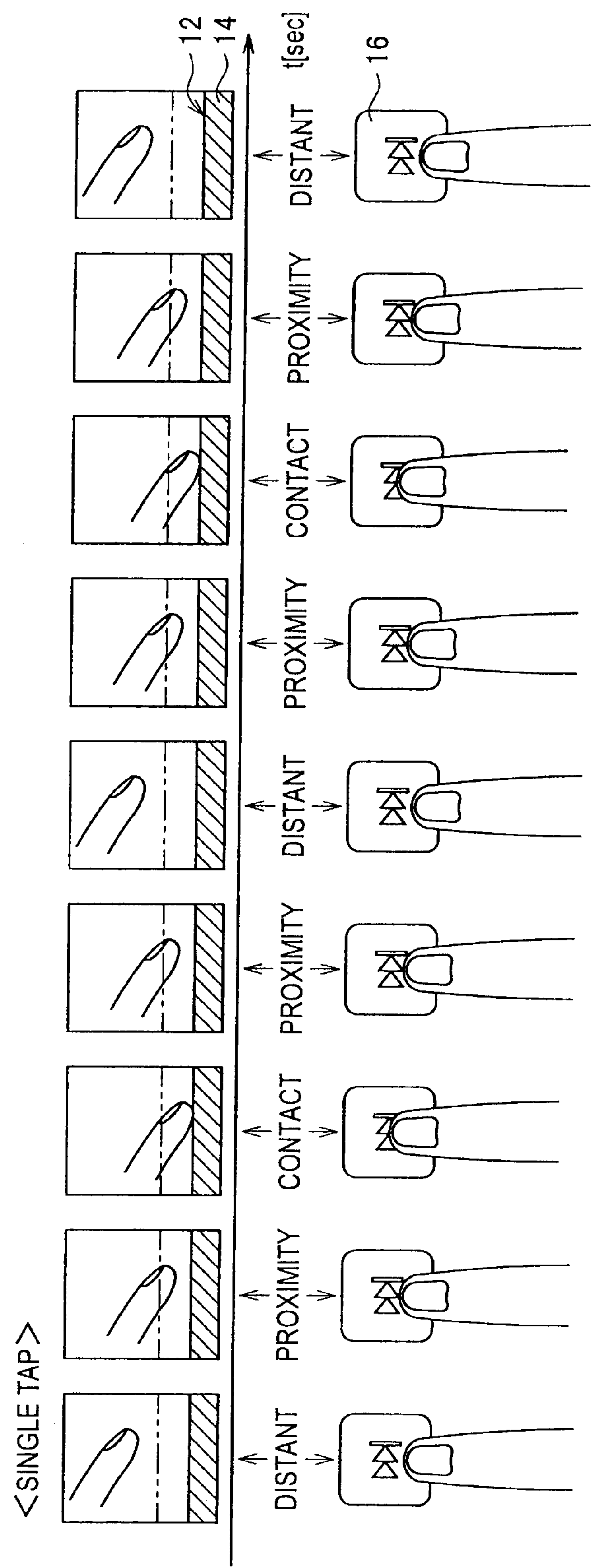
FIG. 6 is a view to describe a relationship between a single tap determined in the operation command determination process of FIG. 4 and a change in finger state.

In the case where the operation of a finger with the display 12 repeats the state change of distant state→proximity state→contact state→proximity state→distant state . . . a plurality of times as shown in FIG. 6, at the first state change (from the distant state to the proximity state), the state change identification unit 24 determines NO in the step S415, and the process proceeds to the step S440. In the step S440, the operation command setting unit 26 maintains the current state without setting an operation command for changing display of the display 12.

At the next state change (from the proximity state to the contact state) shown in FIG. 6 also, the state change identification unit 24 determines NO in the step S415, and the process proceeds to the step S440. In the step S440, the operation command setting unit 26 maintains the current state without setting an operation command for changing display of the display 12.

At the next state change (from the contact state to the proximity state) shown in FIG. 6, the state change identification unit 24 determines YES in the step S415, and the state decision process of FIG. 5 is executed again in the step S420. The next state shown in FIG. 6 is the distant state. Thus, in the step S425, the state change identification unit 24 identifies that the state change is from the proximity state to the distant state, and the process proceeds to the step S430. The operation command setting unit 26 determines that it is a single tap and sets an operation command of a screen operation that is assigned in advance to the single tap. For a plurality of times of single tap, the above operation is repeated, so that an operation command of a screen operation assigned in advance to the single tap is set repeatedly.

For example, when the screen operation that is assigned in advance to the single tap for the GUI button 16 in FIG. 6 is next track selection, the operation command setting unit 26 sets an operation command for selecting the next track. The screen control unit 28 displays the selected next track name on the display 12 according to the operation command set by the operation command setting unit 26. For a plurality of times of single tap, the above operation is repeated, so that track names are sequentially displayed on the display 12.

(Double Tap)

Figure 7:
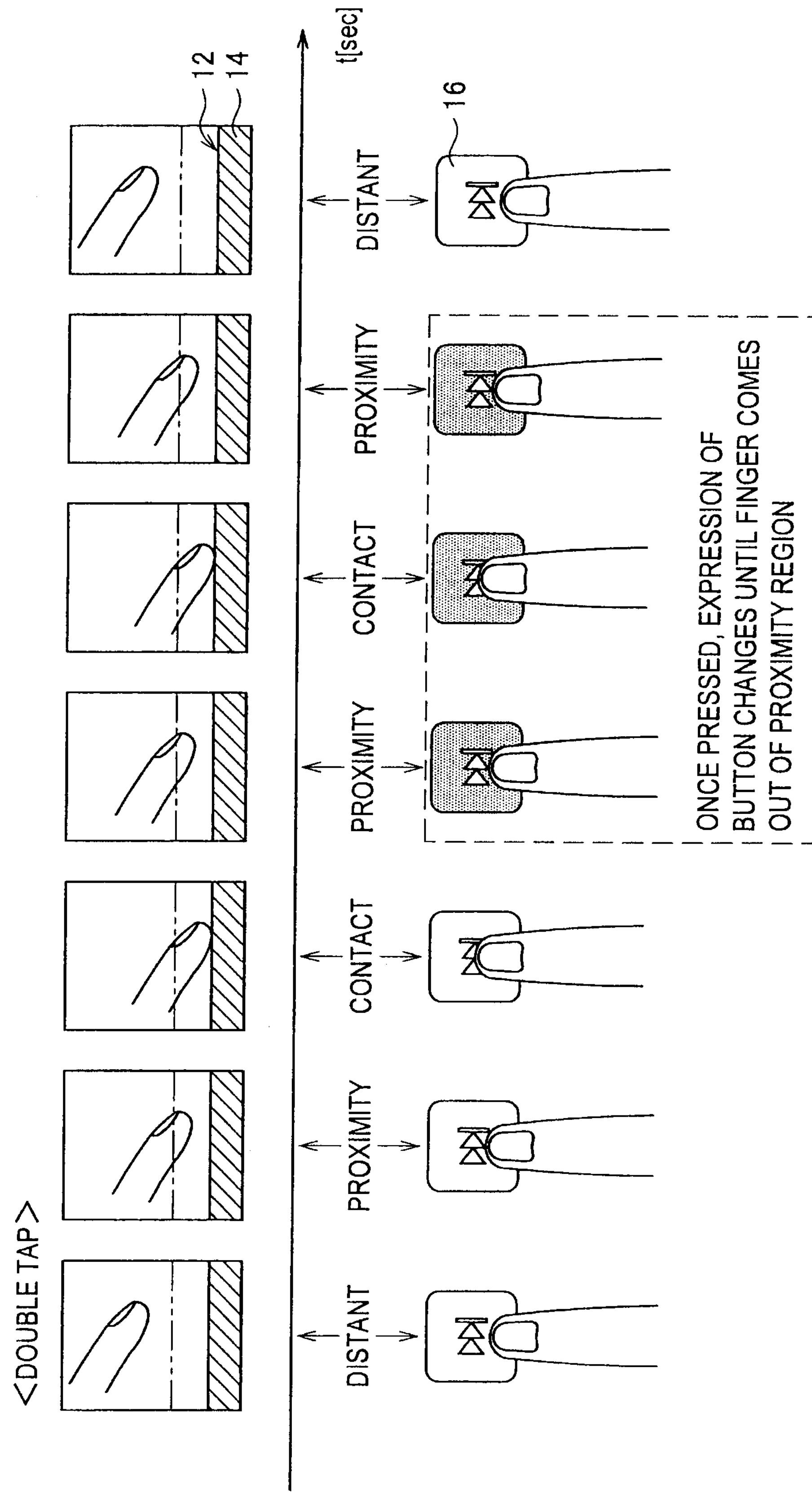
FIG. 7 is a view to describe a relationship between a double tap determined in the operation command determination process of FIG. 4 and a change in finger state.

In the case where the operation of a finger with the display 12 repeats the state change of distant state→proximity state→contact state→proximity state→contact state→proximity state→distant state . . . as shown in FIG. 7, at the first state change (from the distant state to the proximity state), the state change identification unit 24 determines NO in the step S415, and the process proceeds to the step S440. In the step S440, the operation command setting unit 26 maintains the current state without setting an operation command for changing display of the display 12.

At the next state change (from the proximity state to the contact state) shown in FIG. 7 also, the state change identification unit 24 determines NO in the step S415, and the process proceeds to the step S440. In the step S440, the operation command setting unit 26 maintains the current state without setting an operation command for changing display of the display 12.

At the next state change (from the contact state to the proximity state) shown in FIG. 7, the state change identification unit 24 determines YES in the step S415, and the state decision process in FIG. 5 is executed again. The next state shown in FIG. 7 is the contact state. Thus, in the step S425, the state change identification unit 24 identifies that the state change is from the proximity state to the contact state, and the process proceeds to the step S435. The operation command setting unit 26 determines that it is a double tap and sets an operation command of a screen operation that is assigned in advance to the double tap.

For example, when the screen operation that is assigned in advance to the double tap for the GUI button 16 in FIG. 7 is next album selection, the operation command setting unit 26 sets an operation command for selecting the next album. The screen control unit 28 displays the selected next album name on the display 12 according to the operation command set by the operation command setting unit 26.

Note that, when the GUI button 16 is pressed once, the screen control unit 28 may control the screen in such a way that the expression of the GUI button 16 changes until the finger comes out of the proximity region as shown in FIG. 7. For example, the screen control unit 28 may change the color of the GUI button 16 to a striking color such as red while the finger is making an operation of a double tap.

As described above, with use of the mobile device 10 according to the embodiment, when controlling display of the display screen according to the contact state detected by the touch panel 14, an operation command to be set can be changed depending on a state change that transitions from the proximity state to the next state. As a result, according to the set operation command, display on the display 12 can be changed depending on the state change. It is thereby possible to increase variations in screen operation, such as assigning a plurality of operation commands to one GUI button, for example, and enhancing usability by reducing operations with a high load for a user.

Further, with use of the mobile device 10 according to the embodiment, it is possible to provide a user interface that enables high-speed operation. For example, a double tap has been heretofore identified based on a change in contact state in the time direction. Therefore, it has taken a certain time for identification, and it has been unable to input a single tap a plurality of times for a short time. On the other hand, because the mobile device 10 according to the embodiment identifies a double tap based only on a state change, the time factor is not necessary for identification of a double tap. It is therefore possible in this embodiment to input a double tap and a single dap at high speed in a short time without the need to always take a certain time for identification like the way it has been.

(Assignment of Tap or Weak Tap)

Figure 8:
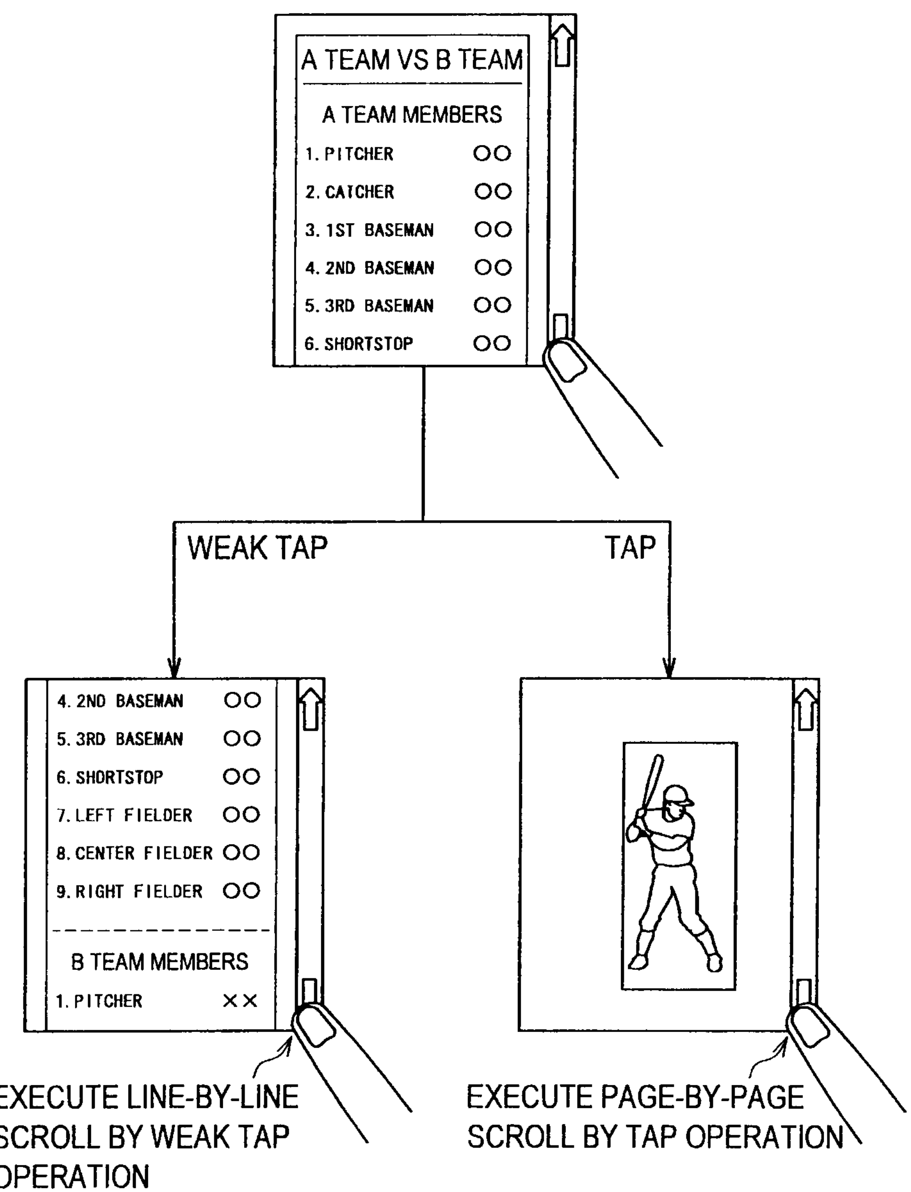
FIG. 8 is a view to describe other operation commands assigned in the mobile device according to the first embodiment.

As another example of increasing variations in screen operation, an example of assigning a tap or a weak tap as an operation command depending on a difference in state change is described hereinafter with reference to FIG. 8.

(Tap)

In this example, after executing the steps S405 to S425 and proceeding to the step S430 in the operation command determination process of FIG. 4, the operation command setting unit 26 determines that a user's screen operation is a normal tap. The operation command setting unit 26 sets a page-by-page scroll as an operation command corresponding to the tap. In response to the set operation command, the screen control unit 28 executes a page-by-page scroll of a screen corresponding to the finger's tap operation as shown in the lower right of FIG. 8.

(Weak Tap)

On the other hand, after executing the steps S405 to S425 and proceeding to the step S435 in the operation command determination process of FIG. 4, the operation command setting unit 26 determines that a user's screen operation is a weak tap. The operation command setting unit 26 sets a line-by-line scroll as an operation command corresponding to the weak tap. In response to the set operation command, the screen control unit 28 executes a line-by-line scroll of a screen corresponding to the finger's weak tap operation as shown in the lower left of FIG. 8. A user can thereby make rough positioning with the tap and make detailed adjustment with the weak tap.

Note that because tapped coordinates are defined only by the contact state in this embodiment, an error in the proximity state causes no problem. Further, with use of a device capable of measuring the proximity state in multiple stages, it is feasible to define three or mode kinds of taps.

As described above, in the mobile device 10 according to the embodiment, the state change identification unit 24 identifies a state change from the contact state to the distant state (a transition from the contact state through the proximity state to the distant state) with the display 12 or a state change from the contact state to the proximity state (a transition from the contact state to the proximity state and no transition from the proximity state to the distant state) with the display 12. Then, the operation command setting unit 26 sets a different operation command depending on the state change identified by the state change identification unit 24. In this manner, this embodiment assigns an operation command separately depending on a state change after the contact state, rather than assigning operation commands respectively to the contact state and the proximity state. It is thus possible to avoid a difficulty in operation and occurrence of an operating error when a user performs a screen operation by distinguishing between the contact state and the proximity state and thereby achieve wider variations in screen operation and enhanced usability.

Second Embodiment

A mobile device 10 according to a second embodiment of the present invention is described hereinafter. A hardware configuration of the mobile device 10 is the same as that of the mobile device 10 according to the first embodiment and not redundantly described.

2-1. Functional Configuration of Mobile Device

The mobile device 10 according to the second embodiment has a functional configuration shown in the functional block of FIG. 3. Specifically, the mobile device 10 according to the embodiment, like the first embodiment, includes a state decision unit 20, a storage unit 22, a state change identification unit 24, an operation command setting unit 26, and a screen control unit 28. The functions of the state decision unit 20, the storage unit 22 and the state change identification unit 24 are the same as those of the first embodiment and thus not redundantly described. Further, in this embodiment also, each function of the mobile device 10 is implemented when the CPU 32 reads and executes each program from the RAM 34 or the nonvolatile memory 36.

When the state change identified by the state change identification unit 24 is a state change from the contact state to the distant state (a transition from the contact state through the proximity state to the distant state), the operation command setting unit 26 directs the screen control unit 28 to execute the set operation command. In response thereto, the screen control unit 28 controls display of the display 12 according to the operation command.

On the other hand, when the state change identified by the state change identification unit 24 is a state change from the contact state to the proximity state (a transition from the contact state to the proximity state and no transition from the proximity state to the distant state), the operation command setting unit 26 directs the screen control unit 28 to refrain from executing the set operation command. In response thereto, the screen control unit 28 refrains from executing the operation command and maintains the current display state of the display 12.

2-2. Operation of Mobile Device: Operation Command Determination Process

Figure 9:
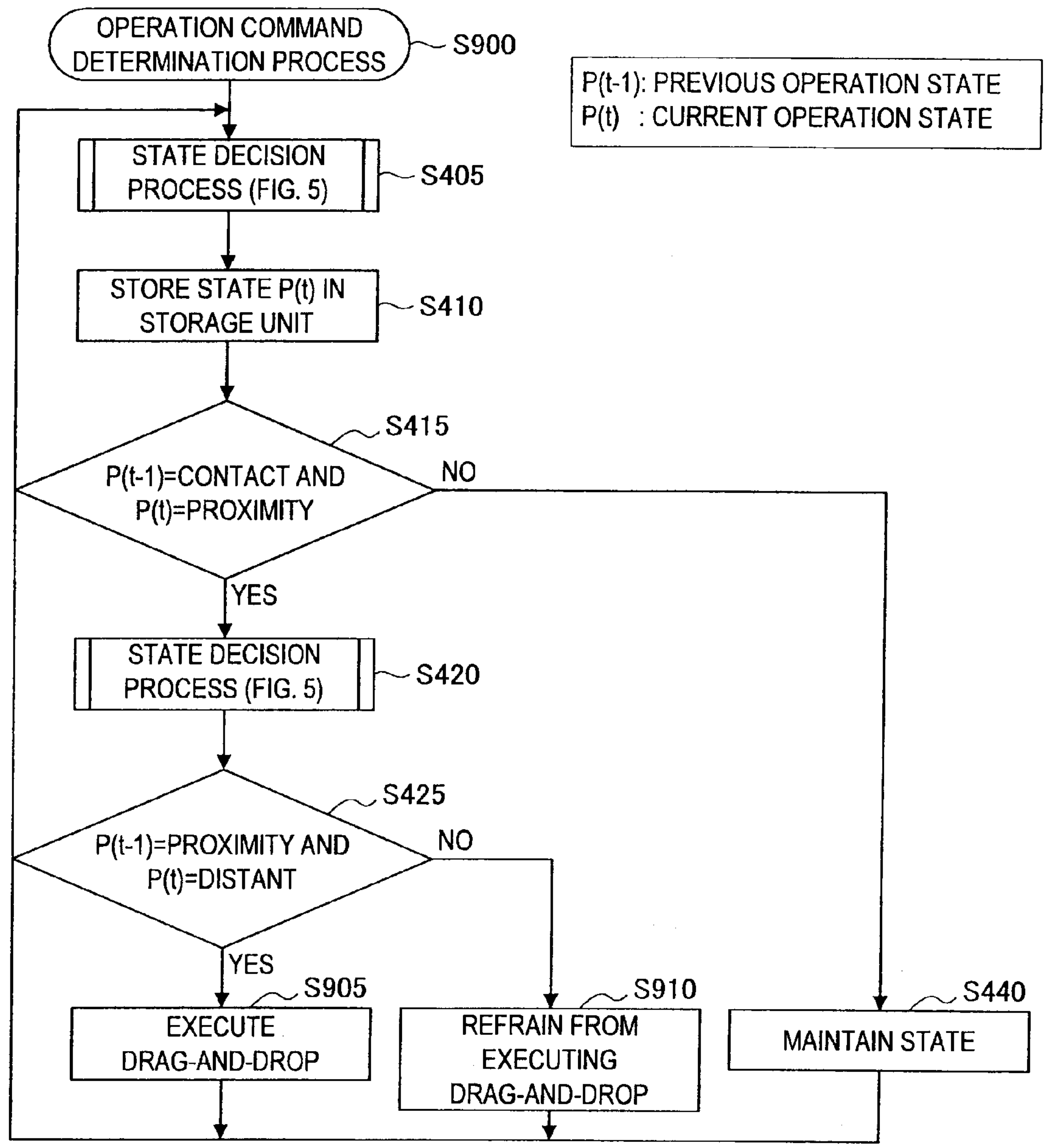
FIG. 9 is a flowchart showing an operation command determination process (main routine) executed in the mobile device according to the second embodiment.

The operation command determination process of the mobile device 10 according to the embodiment is described hereinafter with reference to FIG. 9. FIG. 9 is a flowchart showing the operation command determination process that is executed by the mobile device 10 according to the embodiment. Hereinafter, the operation command determination process is described by using execution and non-execution of drag-and-drop as an example. Note that the following operation can be also regarded as the operation of a display apparatus incorporated into the mobile device 10 according to the embodiment.

(Execution and Non-Execution of Drag-and-Drop)

When the operation command determination process is started in the step S900, the state decision unit 20 executes the routine of the state decision process (FIG. 5) in the step S405. The state decision process is described in the first embodiment and not redundantly described herein. The operation state P(t) that is decided this time in the state decision process of the step S405 is stored in the storage unit 22 in the step S410.

Then, the process proceeds to the step S415, and the state change identification unit 24 identifies whether the finger state has changed from the contact state to the proximity state. When the state change is from the contact state to the proximity state, the process proceeds to the step S420 to execute the state decision process in FIG. 5 again, and then proceeds to the step S425. In the step S425, the state change identification unit 24 identifies whether the finger state has changed from the proximity state to the distant state. As a result of the identification, when the state changes from the contact state to the proximity state (S415) and further changes from the proximity state to the distant state (S425), the process proceeds to the step S905. In the step S905, the operation command setting unit 26 sets an operation command to drag-and-drop an image with which a finger is in contact.

On the other hand, as a result of the identification, when the state changes from the contact state to the proximity state (S415) and does not change from the proximity state to the distant state (S425), the process proceeds to the step S910. In the step S910, the operation command setting unit 26 refrains from executing the drag-and-drop operation of an image with which a finger is in contact. Thus, the image with which a finger is in contact is not dragged-and-dropped, and the current state is maintained.

Note that, when the state change identification unit 24 identifies in the step S415 that the state does not change from the contact state to the proximity state, the process proceeds to the step S440, and the operation command setting unit 26 maintains the current state without setting an operation command for changing display of the display 12.

In the operation command determination process according to the embodiment, when the state changes from the contact state to the proximity state and does not change from the proximity state to the distant state, an image with which a finger is in contact is not dragged-and-dropped as shown in the lower part of FIG. 9. In this manner, the operation command determination process according to the embodiment refrains from executing the drop operation of the dragged data in the event that a user takes the finger off the display 12 by accident.

On the other hand, in the operation command determination process according to the embodiment, when the state changes from the contact state to the proximity state and further changes from the proximity state to the distant state, an image with which a finger is in contact is dragged-and-dropped. In this manner, the operation command determination process according to the embodiment determines that a finger operation is not accidental and executes the drag-and-drop operation when a user takes the finger off the display 12 by the proximity region or farther.

Figure 10:
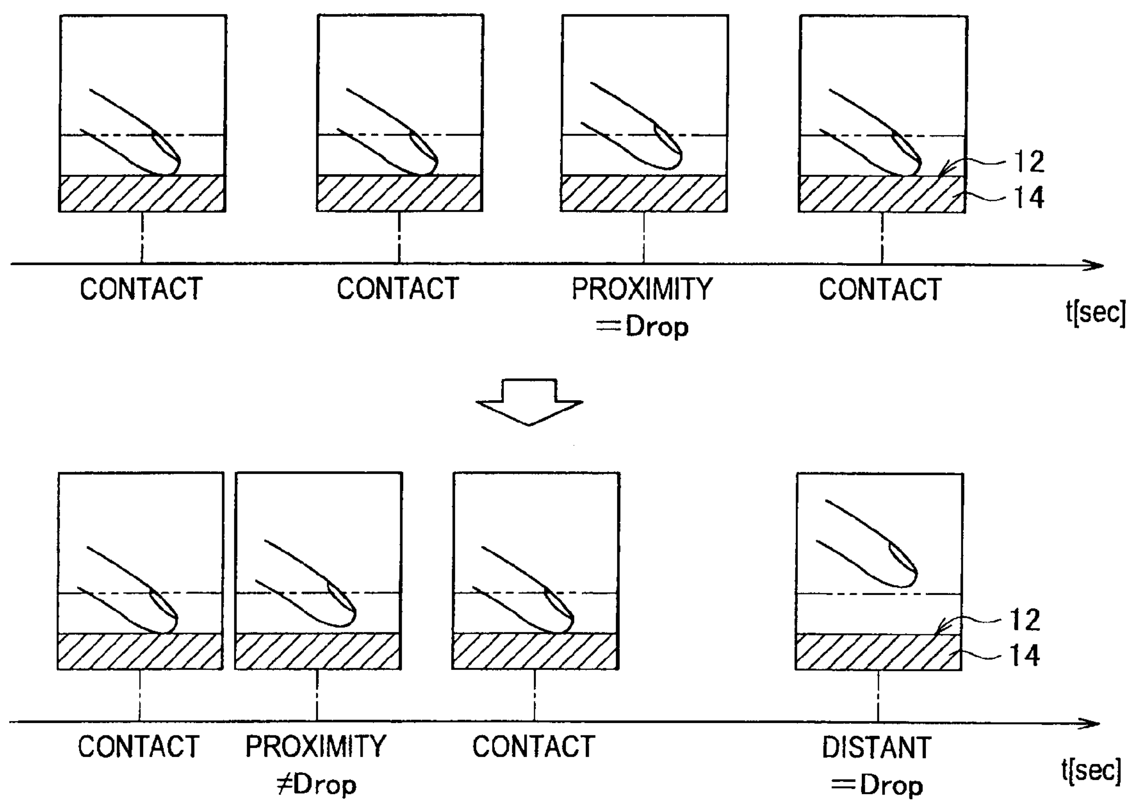
FIG. 10 is a view to describe a relationship between drag-and-drop determined in the operation command determination process of FIG. 9 and a change in finger state.

Heretofore, when a finger is raised off the display 12 if only a little during operation even without user's intention, the drag-and-drop operation is executed as shown in the upper part of FIG. 10, which leads to an operating error. However, in this embodiment, a drop is not made in the state where a finger is raised off the display 12 only a little during operation, and a state change from the proximity state to the distant state is regarded as the timing of a drop as shown in the lower part of FIG. 10, thereby eliminating an operating error which has occurred hitherto and enhancing usability.

Alternative Example

Figure 11:
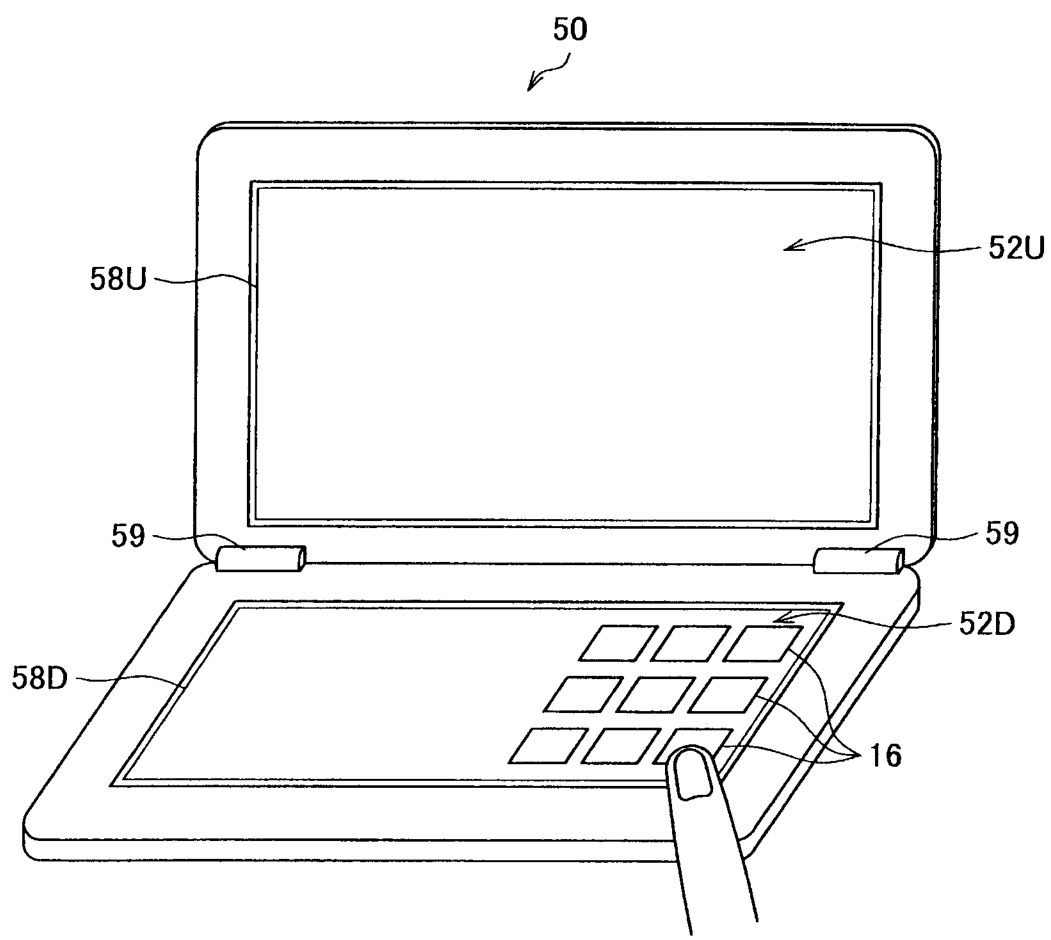
FIG. 11 is a view showing an example of a mobile device according to an alternative example.

A mobile device 50 of FIG. 11 is briefly described hereinafter as an alternative example of a portable device that incorporates a display apparatus according to each embodiment described above. The mobile device 50 has two screens: an upper display 52U and a lower display 52D. Touch panels 58U and 58D are mounted on the upper displays 52U and the lower display 52D, respectively. The mobile device 50 is foldable by a hinge mechanism 59 attached at the center, thus having a portable structure.

With use of the display apparatus incorporated into the mobile device 50 according to the alternative example also, when controlling display of the display screen according to the contact state of a finger with the GUI button 16 which is detected by the device, display of the display can be changed depending on the identified state change. It is thereby possible to achieve wider variations in screen operation and enhanced usability.

According to each embodiment described above, it is possible to discriminate between a double tap and a plurality of single taps, discriminate between two kinds of taps and support a drag-and-drop operation by not only distinguishing between the contact state and the non-contact state but also identifying a change in finger's state. It is thereby possible to reduce operations with a high load for a user and provide a user interface with high usability.

In the above embodiments, the operations of the respective units are related to each other and may be replaced with a series of operations or a series of processing in consideration of the relation to each other. The embodiment of the display apparatus can be thereby converted into an embodiment of a display method and an embodiment of a program for causing a computer to implement the functions of the display apparatus.

Therefore, there can be provided a display method including the steps of detecting an operation performed by a user in the display 12 by the touch panel 14, deciding one of the contact state, the proximity state and the distant state with the display 12 based on the user's operation detected by the touch panel 14, identifying a state change in the user's operation according to the decided state, and setting an operation command depending on the identified state change when setting an operation command for controlling display of the display 12 in response to an operation performed by a user.

Further, there can be also provided a program causing a computer to execute a process including the processing of detecting an operation performed by a user in the display 12 by the touch panel 14, deciding one of the contact state, the proximity state and the distant state with the display 12 based on the user's operation detected by the touch panel 14, identifying a state change in the user's operation according to the decided state, and setting an operation command depending on the identified state change when setting an operation command for controlling display of the display 12 in response to an operation performed by a user.

Note that, in this specification, the steps shown in the flowchart include not only the processing executed in chronological order according to the sequence described therein but also the processing executed in parallel or individually, not necessarily processed in chronological order. Further, the steps processed in chronological order can be performed in a different sequence as appropriate depending on the circumstances.

It should be understood by those skilled in the art that various modifications, combinations, sub-combinations and alterations may occur depending on design requirements and other factors insofar as they are within the scope of the appended claims or the equivalents thereof.

For example, an example of assigning a plurality of operation commands to one GUI button is not limited to the examples described in the above embodiments. Another example of assigning a plurality of operation commands to one GUI button may be a case of setting operation commands for content selection and index feed to one GUI button.

Further, a state change may be applied to an operation command for character input. For example, when performing character input of "Thank you", for example, after a user inputs the characters "Thank", the user changes the finger's state from the proximity state to the distant state. A blank input is assigned in advance as an operation command to the state change from the proximity state to the distant state. A blank between "Thank" and "you" is thereby input. After that, the user inputs the characters "you". In this manner, a change in finger's state may be applied to character input.

A contact sensor of the device that detects a user's screen operation according to the present invention may be a touch sensor, a touch panel, a touch screen, a touch pad or the like having a matrix switch, a resistive switch, a surface acoustic wave switch or the like, for example.

The touch panel incorporated into the mobile device according to the present invention preferably has a function to detect pressing against the display 12. The touch panel 14 can thereby detect four state changes of the distant state, the proximity state, the contact state and the press state, and variations in operation can be further increased by combining such state changes.

The present application contains subject matter related to that disclosed in Japanese Priority Patent Application JP 2009-182581 filed in the Japan Patent Office on Aug. 5, 2009, the entire content of which is hereby incorporated by reference.

What is claimed is:

1. A display apparatus comprising:

a display screen;

a device that detects an operation performed by a user in the display screen;

a state decision unit that decides one of a contact state, a proximity state and a distant state with the display screen based on the user's operation detected by the device;

a storage unit that stores a previous decision result by the state decision unit of deciding the one of the contact state, the proximity state and the distant state at a previous point in time;

a state change identification unit that identifies a state change in the user's operation according to the state decided by the state decision unit and the previous decision result stored in the storage unit; and an operation command setting unit that sets an operation command depending on the state change identified by the state change identification unit when setting the operation command for controlling display of the display screen in response to the user's operation, wherein the state change identification unit identifies from which to which of the contact state, the proximity state and the distant state the operation performed by a user in the display screen has changed based on a decision result by the state decision unit, the state change identification unit identifies a state change from the contact state to the distant state with the display screen or a state change from the contact state to the proximity state with the display screen, based on the previous decision result stored in the storage unit and a current decision result decided by the state decision unit, and the operation command setting unit sets a different operation command depending on the state change identified by the state change identification unit.

2. The display apparatus according to claim 1, further comprising:

a screen control unit that changes display of the display screen according to the operation command set by the operation command setting unit.

3. The display apparatus according to claim 2, wherein when the state change identified by the state change identification unit is a state change from the contact state to the distant state, the operation command setting unit directs the screen control unit to execute the set operation command.

4. The display apparatus according to claim 2, wherein when the state change identified by the state change identification unit is a state change from the contact state to the proximity state, the operation command setting unit directs the screen control unit to refrain from executing the set operation command.

5. The display apparatus according to claim 1, wherein the state change identification unit detects a transition from a past state to a current state based on a movement of a position of the user's operation, the past state being one of the contact state, the proximity state and the distant state, and the current state being another one of the contact state, the proximity state and the distant state.

6. The display apparatus according to claim 1, wherein the state change identification unit determines whether the state in the user's operation has changed as a result of a transition of the user's operation from the proximity state to the distant state, or whether the state in the user's operation has changed as a result of a transition of the user's operation from the proximity state to the contact state, wherein, when the state change identification unit determines that the state in the user's operation has changed as the result of the transition from the proximity state to the distant state, the operation command setting unit sets a first operation command for controlling display of the display screen in response to the user's operation, and wherein, when the state change identification unit determines that the state in the user's operation has changed as the result of the transition from the proximity state to the contact state, the operation command setting unit sets a second operation command for controlling display of the display screen in response to the user's operation, the second operation being different than the first operation.

7. The display apparatus according to claim 1, wherein the identified state change is a change detected to have occurred from a first one of the contact state, the proximity state or the distant state detected at a first point in time to a second one of the contact state, the proximity state or the distant state detected at a second point in time later than the first point in time, the first one of the contact state, the proximity state or the distant state being different than the second one of the contact state, the proximity state or the distant state.

8. A display method comprising the steps of:

detecting an operation performed by a user in a display screen by a device;

deciding one of a contact state, a proximity state and a distant state with the display screen based on the user's operation detected by the device;

storing a previous decision result of deciding the one of the contact state, the proximity state and the distant state at a previous point in time;

identifying a state change in the user's operation according to the decided state and the previous decision result; and setting an operation command depending on the identified state change when setting the operation command for controlling display of the display screen in response to the user's operation, wherein the identifying the state change comprises identifying from which to which of the contact state, the proximity state and the distant state the operation performed by a user in the display screen has changed based on a decision result of the deciding of the one of the contact state, the proximity state and the distant state with the display screen, a state change from the contact state to the distant state with the display screen is identified or a state change from the contact state to the proximity state with the display screen is identified, based on the stored previous decision result and a decided current decision result, and a different operation command is set depending on the identified state change.

9. The display method according to claim 8, wherein the identifying the state change comprises detecting a transition from a past state to a current state based on a movement of a position of the user's operation, the past state being one of the contact state, the proximity state and the distant state, and the current state being another one of the contact state, the proximity state and the distant state.

10. The display method according to claim 8, wherein the identifying the state change comprises determining whether the state in the user's operation has changed as a result of a transition of the user's operation from the proximity state to the distant state, or whether the state in the user's operation has changed as a result of a transition of the user's operation from the proximity state to the contact state, wherein, when the state in the user's operation is determined to have changed as the result of the transition from the proximity state to the distant state, a first operation command is set for controlling display of the display screen in response to the user's operation, and wherein, when the state in the user's operation is determined to have changed as the result of the transition from the proximity state to the contact state, a second operation command is set for controlling display of the display screen in response to the user's operation, the second operation being different than the first operation.

11. The display method according to claim 8, wherein the identified state change is a change detected to have occurred from a first one of the contact state, the proximity state or the distant state detected at a first point in time to a second one of the contact state, the proximity state or the distant state detected at a second point in time later than the first point in time, the first one of the contact state, the proximity state or the distant state being different than the second one of the contact state, the proximity state or the distant state.

12. A program stored on a computer readable media causing a computer to execute a process comprising processing of:

detecting an operation performed by a user in a display screen by a device;

deciding one of a contact state, a proximity state and a distant state with the display screen based on the user's operation detected by the device;

storing a previous decision result of deciding the one of the contact state, the proximity state and the distant state at a previous point in time;

identifying a state change in the user's operation according to the decided state and the previous decision result; and setting an operation command depending on the identified state change when setting the operation command for controlling display of the display screen in response to the user's operation, wherein the identifying the state change comprises identifying from which to which of the contact state, the proximity state and the distant state the operation performed by a user in the display screen has changed based on a decision result of the deciding of the one of the contact state, the proximity state and the distant state with the display screen, a state change from the contact state to the distant state with the display screen is identified or a state change from the contact state to the proximity state with the display screen is identified, based on the stored previous decision result and a decided current decision result, and a different operation command is set depending on the identified state change.

13. The program according to claim 12, wherein the identifying the state change comprises detecting a transition from a past state to a current state based on a movement of a position of the user's operation, the past state being one of the contact state, the proximity state and the distant state, and the current state being another one of the contact state, the proximity state and the distant state.

14. The program according to claim 13, wherein the identifying the state change comprises determining whether the state in the user's operation has changed as a result of a transition of the user's operation from the proximity state to the distant state, or whether the state in the user's operation has changed as a result of a transition of the user's operation from the proximity state to the contact state, wherein, when the state in the user's operation is determined to have changed as the result of the transition from the proximity state to the distant state, a first operation command is set for controlling display of the display screen in response to the user's operation, and wherein, when the state in the user's operation is determined to have changed as the result of the transition from the proximity state to the contact state, a second operation command is set for controlling display of the display screen in response to the user's operation, the second operation being different than the first operation.

15. The program according to claim 12, wherein the identified state change is a change detected to have occurred from a first one of the contact state, the proximity state or the distant state detected at a first point in time to a second one of the contact state, the proximity state or the distant state detected at a second point in time later than the first point in time, the first one of the contact state, the proximity state or the distant state being different than the second one of the contact state, the proximity state or the distant state.

* * * * *